(12) United States Patent
Segall et al.

(10) Patent No.: US 9,218,271 B2
(45) Date of Patent: Dec. 22, 2015

(54) TEST PLANNING BASED ON DYNAMIC COVERAGE ANALYSIS

(75) Inventors: Itai Segall, Tel-Aviv (IL); Rachel Tzoref-Brill, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 13/252,219

(22) Filed: Oct. 4, 2011

(65) Prior Publication Data

US 2013/0085741 A1    Apr. 4, 2013

(51) Int. Cl.
G06F 9/44      (2006.01)
G06F 11/36     (2006.01)
G06F 11/263    (2006.01)

(52) U.S. Cl.
CPC .......... G06F 11/3676 (2013.01); G06F 11/263 (2013.01); G06F 11/3684 (2013.01)

(58) Field of Classification Search
CPC .............. G06F 11/3684; G06F 11/263; G06F 11/3676; G06F 17/5009; G06F 3/0481; G06F 11/261; G06F 11/3688; G06F 11/3696; G06F 17/211; G06F 17/243; G06F 17/246; G06F 17/30994; G06F 17/5022; G06F 19/322
USPC ................. 714/32–35; 703/6, 7, 22
See application file for complete search history.

(56) References Cited

U.S. PATENT DOCUMENTS

| | | | | |
|---|---|---|---|---|
| 6,182,258 B1 * | 1/2001 | Hollander | ..................... | 714/739 |
| 6,347,388 B1 * | 2/2002 | Hollander | ..................... | 714/739 |
| 6,577,982 B1 * | 6/2003 | Erb | ................ | 702/120 |
| 6,675,138 B1 * | 1/2004 | Hollander et al. | ............... | 703/13 |
| 6,728,641 B1 * | 4/2004 | Cawse | ............. | 506/11 |
| 6,876,941 B2 * | 4/2005 | Nightingale | ................. | 702/120 |
| 6,918,076 B2 * | 7/2005 | Lagoon et al. | ................ | 714/738 |
| 7,134,113 B2 * | 11/2006 | Williams | ...................... | 717/106 |
| 7,278,135 B2 * | 10/2007 | Czerwonka | .................... | 717/124 |
| 7,389,215 B2 * | 6/2008 | Azatchi et al. | .................. | 703/14 |
| 7,428,715 B2 * | 9/2008 | Fournier et al. | ................... | 716/136 |
| 7,613,973 B2 * | 11/2009 | Lagoon et al. | ................ | 714/738 |
| 7,636,871 B1 * | 12/2009 | Blue et al. | ........ | 714/32 |
| 7,805,635 B2 * | 9/2010 | Chakra et al. | ................... | 714/26 |
| 2002/0073375 A1 * | 6/2002 | Hollander | ..................... | 714/739 |
| 2003/0046613 A1 * | 3/2003 | Farchi et al. | ..................... | 714/38 |
| 2003/0233600 A1 * | 12/2003 | Hartman et al. | ................ | 714/32 |
| 2006/0224921 A1 * | 10/2006 | Marimuthu | ...................... | 714/25 |
| 2007/0208606 A1 * | 9/2007 | MacKay et al. | .................. | 705/9 |
| 2007/0266321 A1 * | 11/2007 | Bicker et al. | ................... | 715/713 |
| 2008/0195930 A1 * | 8/2008 | Tolle | ............................ | 715/227 |

(Continued)

OTHER PUBLICATIONS

Cohen et al., The AETG System: An Approach to Testing Based on Combinatorial Design, IEEE Transactions on Software Engineering, vol. 23, No. 7, p. 437-444, Jul. 1997.*

(Continued)

Primary Examiner — Kamini S Shah
Assistant Examiner — Scott S Cook

(57) ABSTRACT

A method for refining a test plan is provided. The method comprises defining a coverage model including: one or more variables, wherein respective values for the variables are assigned, and one or more definitions for value combinations for said variables with assigned values, wherein zero or more of said value combinations are defined according to one or more restrictions for the purpose of generating a test plan to test a system for which the coverage model is constructed; determining zero or more uncovered value combinations in the test plan; and providing means to update the test plan.

21 Claims, 8 Drawing Sheets

(56) References Cited

U.S. PATENT DOCUMENTS

2008/0270993 A1* 10/2008 Tateishi et al. ............... 717/127
2010/0274520 A1* 10/2010 Ur et al. ........................ 702/123
2011/0289396 A1* 11/2011 Oh ................................ 715/212

OTHER PUBLICATIONS

Younis et al., A Strategy for Grid Based T-Way Test Data Generation, Distributed Framework and Applications, p. 73-78, 2008.*
Bryce et al., A Framework for Greedy Methods for Constructing Interaction Test Suites, Software Engineering, 2005. ICSE 2005. Proceedings. 27th International Conference on, May 15-21, 2005, pp. 146-155.*
Groh, M.R., Microsoft Access 2010 Bible, Wiley Publishing, Inc., pp. 299, 459, 517, 672, May 10, 2010 (annotated version provided).*
Georgep at al., Priorities in databases, thread 702-524275, TEK-TIPS Forums, Apr. 11, 2003 [retrieved on Aug. 23, 2013]. Retrieved from the internet: http://www.tek-tips.com/viewthread.cfm?qid=524275 (annotated version provided).*
Benner, J., Useful database administration techniques for Unix (LUW/UDB) DB2, DB2 LUW DBA HowTo, May 27, 2009 [retrieved on Aug. 23, 2013]. Retrieved from the internet: http://www.ebenner.com/db2dba_blog/?p=9 (annotated version provided).*
Ieee Standard Dictionary of Electrical and Electronics Terms, Institute of Electrical and Electronics Engineers (IEEE); 7 edition (Dec. 1, 2000) pp. 636, 1141 (annotated version provided).*
Ylimaz, M., A Brief Tutorial of Test Pattern Generation Using Fastscan V0.2, Department of Electrical and Computer Engineering, Duke University, Jan. 11, 2008 [Retrieved on Aug. 14, 2013]. Retrieved from the Internet: <http://people.ee.duke.edu/~krish/teaching/ECE269/fastscan_tutorial_v02.pdf>.*
Scan and ATPG Process Guide. User Guide, Software Version 8.2008_3 [online]. Mentor Graphics Corporation, Aug. 2008 [retrieved on Aug. 14, 2013]. Retrieved from the Internet: <http://www.google.com/#fp=6fda5af99f858923&q=Fastscan+user+guide.*
FastScan and FlexTest Reference Manual, Software Version V8.6_4, Mentor Graphics Corporation 1999.*
Discover Defects Early, May 15, 2008 [Retrieved Dec. 16, 2013] Retrieved from the internet <URL:*> http://c2.com/cgi/wiki?DiscoverDefectsEarly.*
Myers, B., Hudson, S.E., Rausch, R., Past, Present, and Future of User Interface Software Tools, Carnegie Mellon University, ACM Transactions on Computer-Human Interaction, vol. 7, No. 1, Mar. 2000.*
Horgan, J., Ri, London, S., A Data Flow Coverage Testing Tool for C, IEEE, 1992.*
Ur, S. Code and Functional Coverage Tutorial, May 1999, IBM Research Laboratory in Haifa.*
Functional Coverage, Coverage Directed test Generation, IBM Haifa Labs, Jul. 30, 2008.*
Grindal et al. Combination Testing Strategies A Survey, GMU Technical Report ISE-TR-04-05, Jul. 2004.*
Cohen et al. Interaction Testing of Highly-Configurable Systems in the Presence of Constraints, ISSTA'07, Jul. 9-12, 2007, London, England, United Kingdom.*
Tai et al. A Test Generation Strategy for Pairwise Testing, IEEE Transactions on Software Engineering, vol. 28, No. 1 Jan. 2002.*
Pretschner, A., Model-Based Testing in Practice, 2005.*
Hartman et al. Problems and Algorithms for Covering Arrays, IBM Haifa Research Laboratory, 12/19/200.*
Hartman et al. Software and Hardware Testing Using Combinatorial Covering Suites, IBM Haifa Research Laboratory, Jul. 19, 2002.*
WittySparks, Four toolkits for Java to develop excellent GUI, Jul. 8, 2008 http:www.wittysparks.com/four-toolkits-for-java-to-develop-excellent-gui/.*

* cited by examiner

FIG. 2A

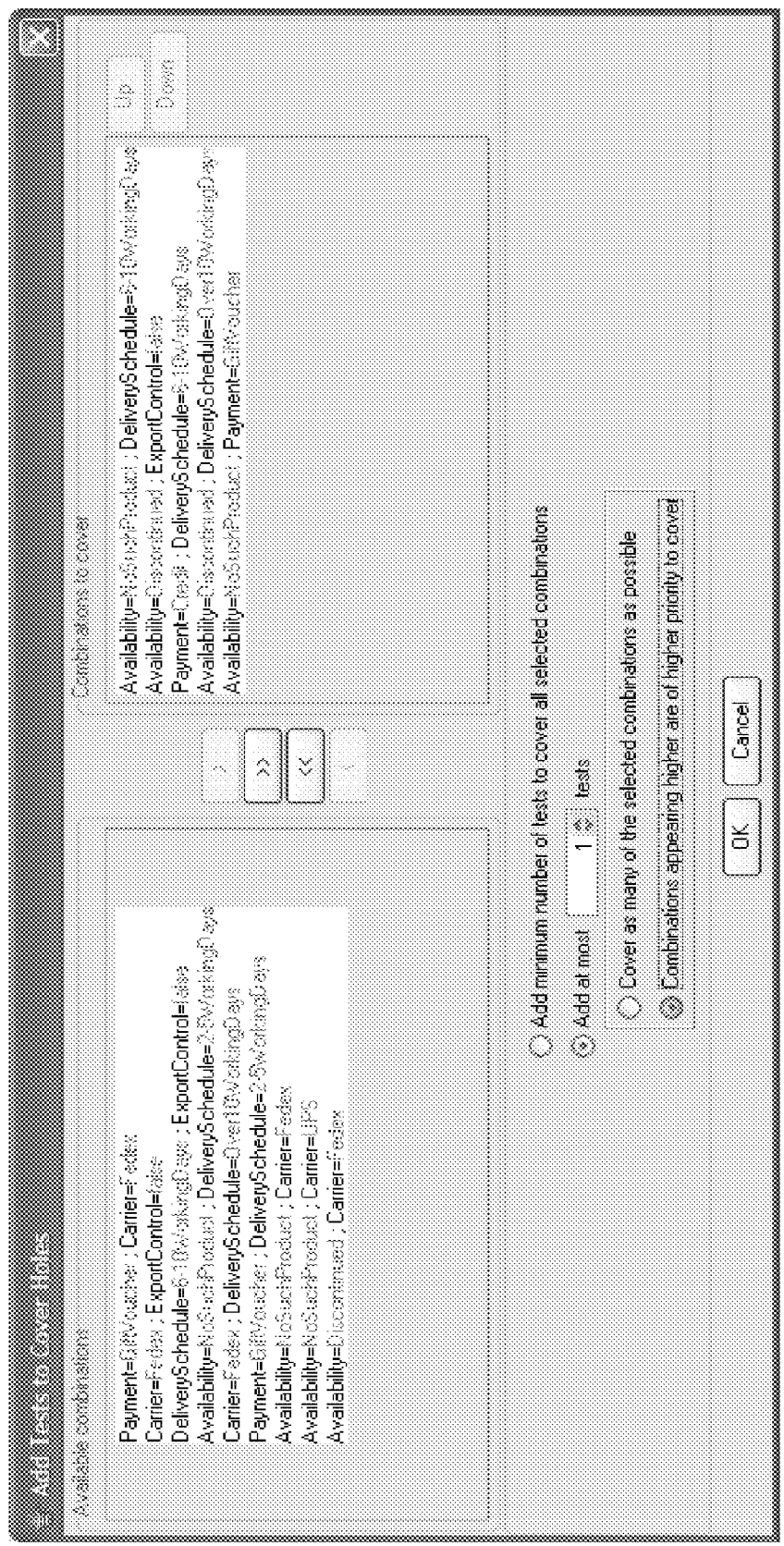

TEST PLANNING BASED ON DYNAMIC COVERAGE ANALYSIS

COPYRIGHT & TRADEMARK NOTICES

A portion of the disclosure of this document may contain material subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to test planning for monitoring system behavior.

BACKGROUND

Model based techniques may be used for generating tests for verifying the behavior of a computing system. Traditionally, a model includes a set of attributes in addition to values for the attributes and corresponding restrictions on said values or value combinations. The set of valid value combinations defines the space to be tested. In a test design that is based on Cartesian product modeling, the test space is selected so that it covers all possible combinations of n number of variables that are not ruled out by restrictions.

The size of a Cartesian product based model is the product of the number of values for each attribute (i.e., $A_1 * A_2 * \ldots * A_n$), where $A_n$ represents the number of valid values for the $n^{th}$ attribute. One would appreciate that the size of the model can become prohibitively large, depending on the number of attributes, the possible number of values assigned to each attribute and the restrictions used to define complex attribute relationships. A test planning scheme is desirable that helps select a subset of tests in a test suite that effectively and efficiently cover the interesting test scenarios.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for refining a test plan is provided. The method comprises defining a coverage model including: one or more variables, wherein respective values for the variables are assigned, and one or more definitions for value combinations for said variables with assigned values, wherein zero or more of said value combinations are defined according to one or more restrictions for the purpose of generating a test plan to test a system for which the coverage model is constructed; determining zero or more uncovered value combinations in the test plan; and providing means to update the test plan to cover at least an uncovered value combinations.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIGS. 2A through 2D are exemplary illustrations of user interface mechanisms implemented for performing one or more functions disclosed in FIGS. 1A through 1B, according to one or more embodiments.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

Figure 1A:
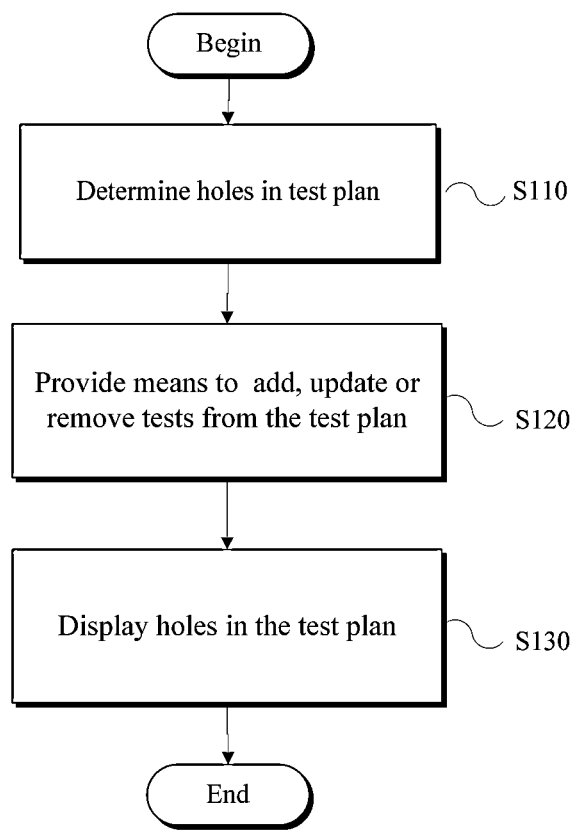
FIGS. 1A and 1B are flow diagrams of exemplary methods for adding, removing or modifying tests in a test plan in consideration to the coverage holes in the test plan, in accordance with one embodiment.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, a coverage model is implemented to test a target system. The model defines variables (i.e., attributes), possible values for the variables, and conditions or restrictions indicating when values for one or more variables or value combinations for a plurality of variables are valid or invalid. The set of valid value combinations defines the coverage model. The test space may be defined by the product (e.g., the Cartesian product) of variable values, taking into account the dictated conditions or restrictions. The size of the test space is approximately proportional to the product of the number of values that can be assigned to each variable.

In one implementation, complexity associated with verification of the test space may be reduced by, for example, narrowing the test space by way of defining additional test coverage conditions, restrictions or requirements. In one embodiment, the test space may be reduced by relaxing the requirement to cover all the combinations of all the variables to a requirement to cover a selected subset of the Cartesian product. For example, given a Cartesian product based model with n variables, a combinatorial algorithm may be used to find a subset of valid combinations in the test space that covers possible combinations of every m variables, wherein m defines a certain interaction level.

The interaction level, depending on implementation, refers to the coverage of the selected subset of the test space, wherein the test space covers the possible combinations of m number of variables in the set defined by the respective coverage model—m is less than or equal to the total number of variables n in the model. As an example, interaction level two (also referred to as a pair-wise interaction) means that, for every two variables, all valid value combinations appear in the selected subset of the test space. Empirical evidence has shown that most bugs depend on interactions between a small number of variables. Testing such interactions leads to detecting a majority of bugs in a system.

In one embodiment, the combinatorial algorithm utilized to provide an m-way combination of values may be used to find a valid set of values for the target variables such that the found set contributes the most to the remaining uncovered combinations (i.e., holes). After applying the combinatorial algorithm to the coverage model with an interaction level m, the resulting test plan may include the valid value tuples of size m, wherein each tuple represents a test (e.g., a combination of variable values) in the test plan.

Referring to FIG. 1A, the test planning scheme may be configured to determine the holes in the test plan (S110). The holes in the test plan may be displayed by way of a user interface mechanism so that a user (e.g., a human operator) may determine whether the test plan adequately covers areas of interest (e.g., interesting variable value combinations). The user interface mechanism may also display the currently selected tests and provide means to add, update or remove certain tests from the test plan (S120). If the removal, addition or update of a test or tests to the test plan changes the extent of coverage for the test space, that change is visually presented to the user as the displayed holes in the test plan are updated in the user interface (S130).

Figure 1B:
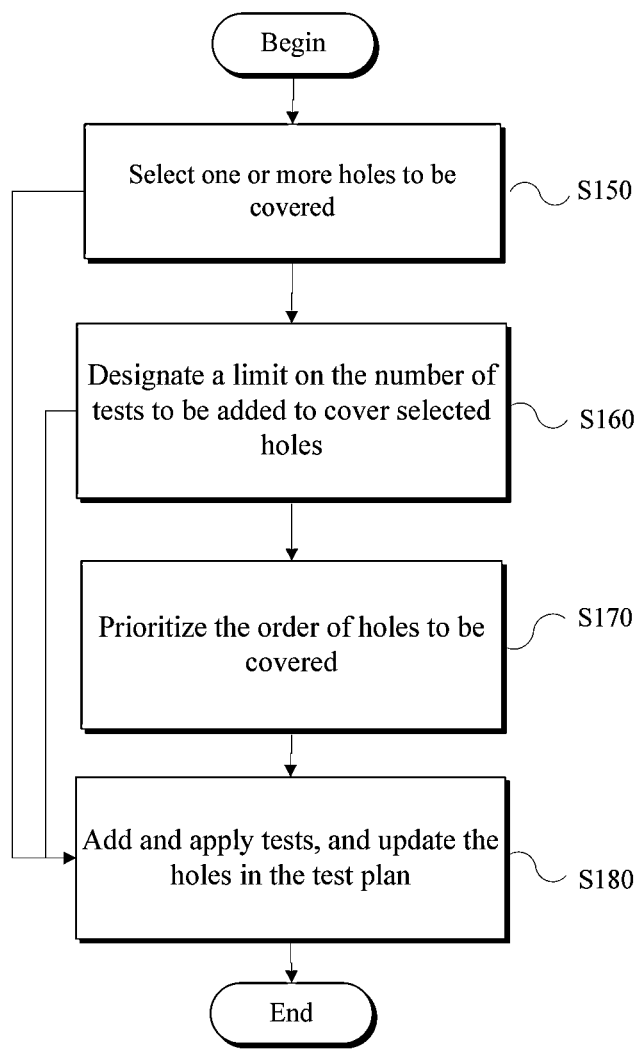

Referring to FIG. 1B, the user interface may provide a user with means to select one or more holes in the test plan to be covered by introduction of additional tests (S150). The user interface may optionally allow a user to place a limit on the number of tests that are to be added to the test plan to cover holes from the selected ones (S160). The selected holes may also optionally be prioritized in an order defined by the user, in case the limit placed on the number of tests prevents addition of enough tests to the test suite to cover all the selected holes (S170). The tests are then added to the test suite according to the above selection, and if application of the added tests changes the extent of coverage for the test space, that change is reflected such that any new or existing holes in the test plan are displayed in the user interface (S180).

In the following, the above methods are disclosed in further detail by way of example as applicable to one or more sample embodiments illustrated in FIGS. 2A through 2D. It is noteworthy that the exemplary embodiments shown are for the purpose of providing a better understanding of the features and the aspects of the disclosed subject matter. Therefore, said embodiments and any related specific details should not be construed as limiting the scope of the claimed subject matter to particular elements or facets, as other alternative functional or structural equivalents are possible without detracting from the claimed scope.

Figure 2A:
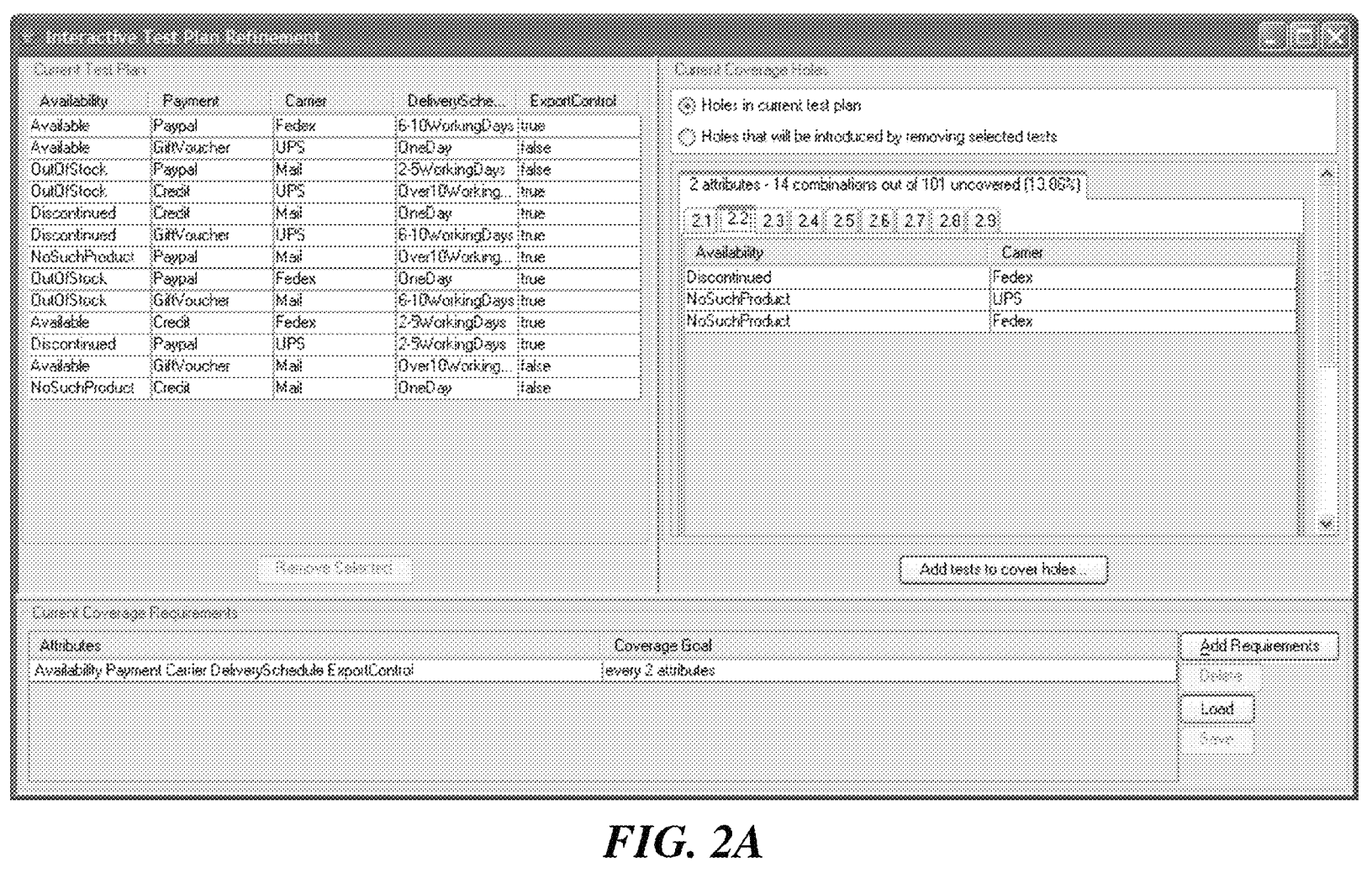

Referring to the example interface shown in FIG. 2A, in one embodiment, the current test plan is displayed in the top-left area, wherein a set of selected variables or attributes (e.g., availability, payment, carrier, delivery schedule, export control, etc.) are grouped in columns such that each row in the column indicates a possible value associated with each attribute in a test in the test plan. For example, the first row is a test scenario in the current test plan, where the tuple (available, paypal, Fedex, 6-10WorkingDays) indicates the respective values for the attributes noted above.

In the top-right area of the user interface, the holes in the current test plan are displayed, where value combinations that are not covered for the two attributes "availability" and "carrier" are listed. For example, the first row indicates that the tuples represented by the pair-wise combinations (Discontinued, Fedex), (noSuchProduct, UPS), (NosuchProduct, Fedex) are not covered in the current test plan. Similarly, there are 8 other sets of pairs of attributes (tabs 2.1 and 2.3 to 2.9) for which not all values are covered under the current test. In total, 14 holes are reported, indicating that 14 out of 101 total valid pairs remain uncovered. At the bottom area, the current designated interaction coverage requirements (e.g., cover every two attributes) for the test plan are displayed. The user may also choose to change the coverage requirements, and get immediate feedback on any changes to the holes in the test plan.

Advantageously, in one or more embodiment, when the current test plan changes (i.e., the number or nature of tests defined in the left area) and thus causes a change in test coverage, the result of the change is directly reflected in relation with the change in the hole coverage (i.e., the list of holes in the right area). In other words, if adding or removing a test from the test plan in the left area, for example, results in introduction or removal of a new hole, then the list in the right area is updated, and vice versa. That is, optionally, there is an implementation for dynamic synchronization during test planning, so that the changes to the test plan and the resulting holes are displayed in real time.

Having the benefit of the noted real time synchronization, a user such as a test planner or a programmable machine may decide to perform different operations. For example, a hole or set of holes shown in the right area may be selected with a request for the test plan to be updated to cover the selected holes. The user may request that the fewest possible number of tests to be added to the test plan to cover as many uncovered holes as possible. In the interface shown in FIG. 2A, the user may also delete one or more tests in the left area, for example, and determine the effect of removing them from the test plan by reviewing the area in the right to determine if a new hole is introduced as a result.

Figure 2B:
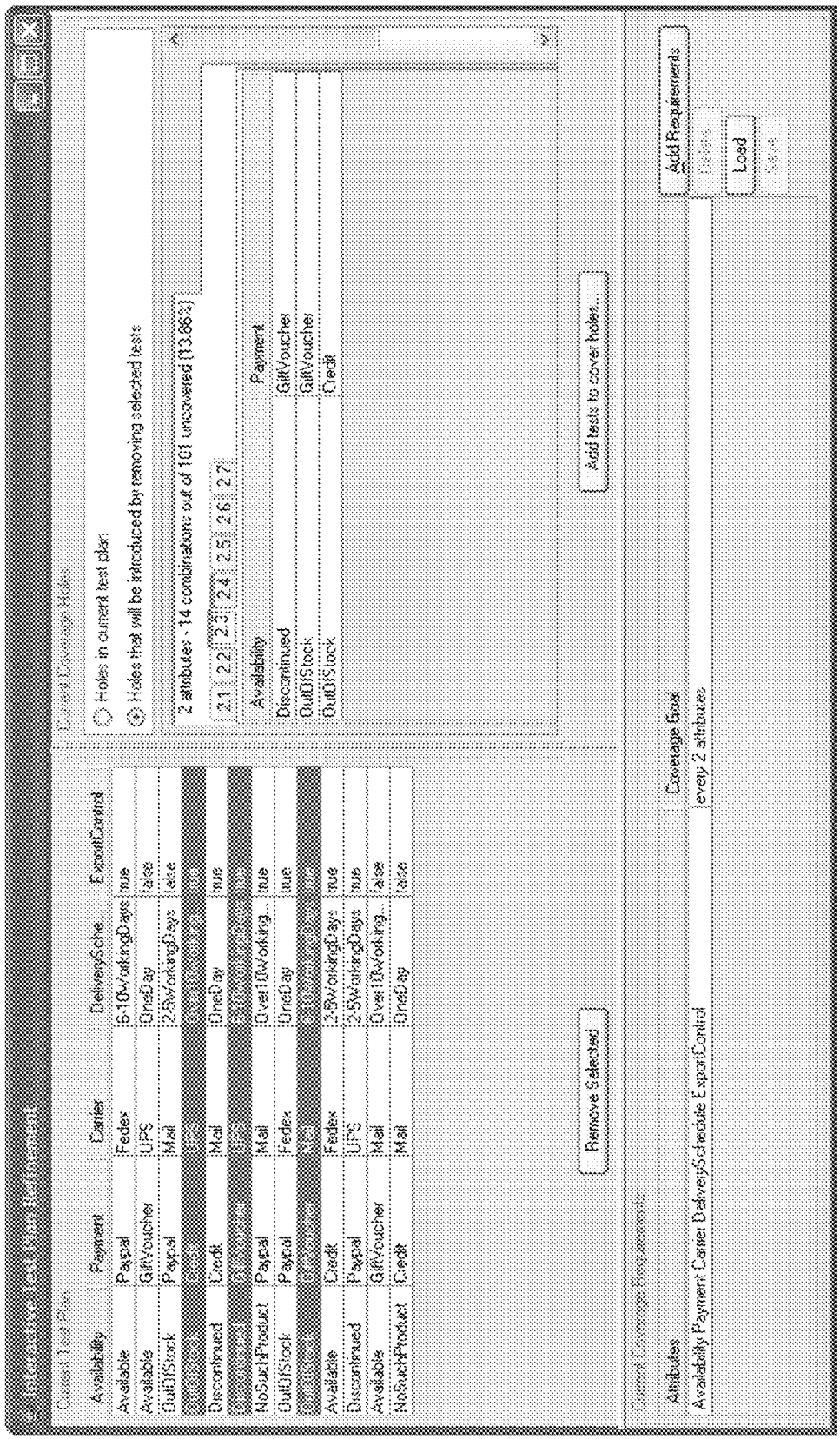

Referring to FIG. 2B, for example, if under the current test plan, the three tests highlighted in the left area are selected to be removed, then under the current coverage holes in the right area, the number of new pairs that will become uncovered if the selected tests are removed is displayed. In this example, removal of the tests in rows 4, 6 and 9 results in additional holes represented by tuples (Discontinued, GiftVoucher), (OutOfStock, GiftVoucher) and (OutOfStock, Credit) for the corresponding attributes "availability" and "payment" respectively. If the user chooses to actually remove the selected tests, then the updated hole coverage results will be viewable as well (e.g., see the example option listed as "Holes in current test plan").

In one embodiment, same or similar views as those suggested above by way of example may be used for displaying holes in the current test plans or holes that will be introduced by removing selected tests, where the latter holes are distinguishable from the former by way of application of distinctive visual effects or user interface features (e.g., using a different color, highlighting, bolding, italics, etc.) or other suitable means that achieve the same or similar results.

Figure 2C:

Referring to FIG. 2C, in one embodiment, the interface may provide a user with the option to add tests to the current test plan by either selecting from a number of available variable value combinations as shown in the left or, for example, by way of manually adding tests. In one embodiment, the available variable value combinations may be the list of holes in the current test plan. As shown in FIG. 2D, if a variable value combination is selected, then the selected combination is moved from the list in the left to the list in the right (e.g., five combinations are shown to have been selected in FIG. 2D).

Furthermore, in one embodiment, additional optional features may be provided to allow a user to designate the importance of one or more selected combinations or indicating the maximum number of test to be added that cover as many of the selected variable value combinations as possible. In the example shown in FIG. 2D, the user may select an option to add the minimum number of tests to cover all the selected combinations, or select a maximum number of tests by entering a value. If such a maximum number is given, the user may further choose whether as many of the combinations as possible are to be covered by these tests, or alternatively define priorities for covering the combinations. Such priorities may be defined, for example, by reordering the combinations in the right column. In FIG. 2D, lower area of the illustrated user interface provides the selectable options.

Referring back to FIGS. 2A and 2B, it is noteworthy that the user interface provided is synchronized in both directions in relation with the changes to the tests listed under the current test plan and the holes identified under the current coverage holes. That is, a user also has the option of selecting a hole or set of holes and may request that the smallest set of tests to be added to the test plan to cover the selected holes, and optionally as many other uncovered holes as possible. In the example interface in FIG. 2A, the above process may be accomplished by activating the button inscribed as "Add tests to cover holes . . . " which in certain embodiment results in a transition to the interface shown in FIG. 2C.

Using the above features, a user may generate a test plan that supplies 100% pairwise coverage, and at the same time view any gaps in coverage for three-way (i.e., interaction level three) variable value combinations in the test. Then, using the provided features above, the user may refine the test plan in order to cover certain holes in the three-way variable value combinations. This allows the user to take educated decisions about limiting, or reducing, the size of a test plan. The user may add, update or remove tests from a test plan, or limit the number of tests the test plan may include according to a set of coverage priorities, for example, with continuous and immediate feedback of the potential coverage holes that may be generated as the result of newly introduced changes to the test plan.

In one embodiment, feedback may include more than the holes that will be generated by the changes, to cover also the holes that will be covered by the changes (e.g., by adding or modifying tests, either manually or via the tool). In one example embodiment, the feedback in the latter case may be provided, for example, by a strike through of the covered holes.

In one embodiment, while working on a test plan, a user may interact with a user interface feature (not shown) to take a snapshot of the current state of coverage so that the user is able to later compare different versions of coverage achieved at different states. For example, an optional "duplicate" button may be implemented in the user interface such that the user interaction with the "duplicate" button results in the duplication of the view presented to the user at that time. The duplicated view may be saved for comparison with another view at a later time.

It is noteworthy that the above disclosed scenarios, methods, implementations and embodiments are provided by way of example. Thus, depending on implementation, optional variables and functions may be utilized to address alternative objectives in configuring a test space. As such, the above examples, embodiments and implementations should not be construed as limiting the scope of the claimed subject matter to the disclosed aspects or details.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
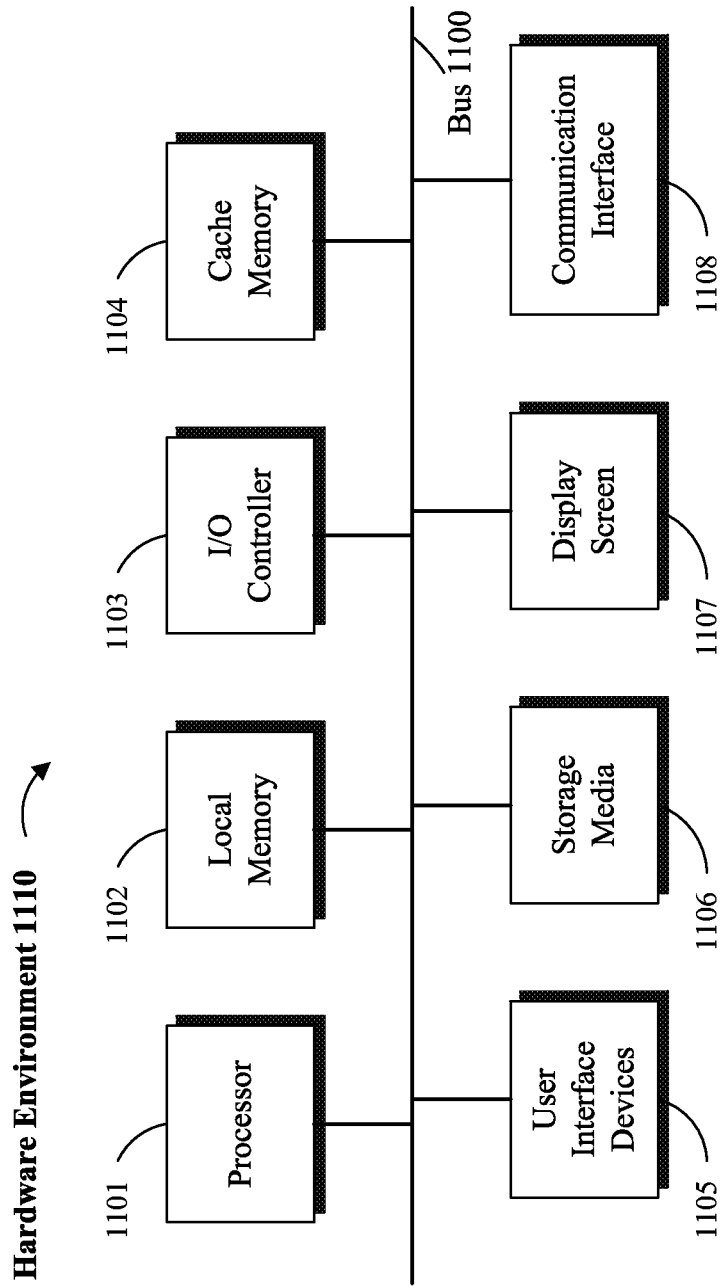
FIGS. 3A and 3B are block diagrams of hardware and software environments in which the disclosed systems and methods may operate, in accordance with one or more embodiments.
Figure 3B:
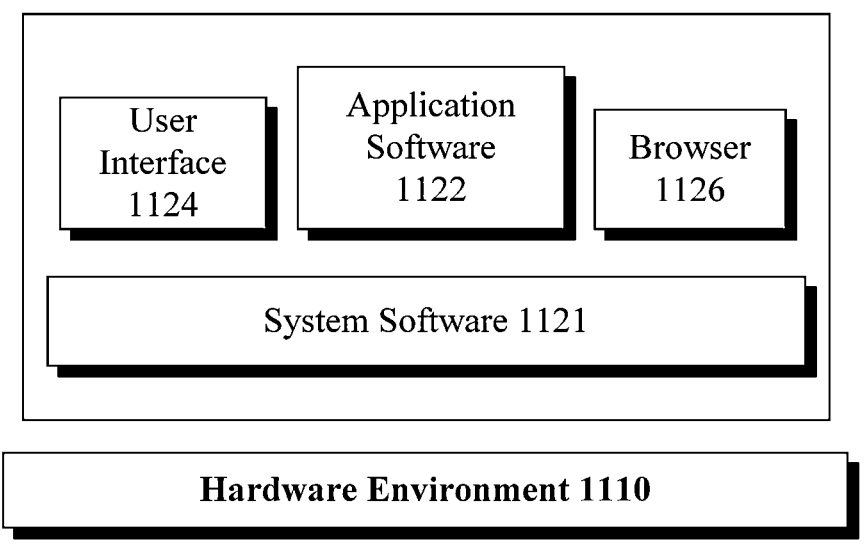

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of computer readable code executed over one or more computing systems represented by the exemplary hardware environment 1110. As illustrated, hardware environment 1110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), or high definition video disk (HD-DVD).

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for assisting a user in modifying a test plan, the method comprising:

obtaining the test plan, wherein the test plan comprises tuples of values of variables of a coverage model, wherein each tuple represents a test in the test plan;

determining, using a processor, a first set of one or more coverage holes in the test plan with respect to the coverage model and with respect to an interaction level, wherein each coverage hole is defined by a combination of values that are not covered by the test plan; and providing a graphical user interface to the user, wherein the graphical user interface comprises a graphical display window visually displaying together a first windowpane and a second windowpane, wherein the first windowpane visually displays the test plan and the second windowpane visually displaying the first set of one or more coverage holes, and in response to the user interacting with the first windowpane of the graphical user interface and indicating an update to the test plan, determining a second set of one or more coverage holes in the modified test plan and continuously and immediately updating the second windowpane of the graphical user interface to visually display the second set of one or more coverage holes in the second windowpane instead of the first set of one or more coverage holes.

2. The method of claim 1, wherein the update to the test plan is selected from the group consisting of:

adding a new test to the test plan;

removing an existing test from the test plan; and modifying an existing test in the test plan by modifying at least one value in a corresponding tuple.

3. The method of claim 1, wherein the user indicating an update to the test plan by selecting, in the graphical user interface, a portion of the first set of one or more coverage holes to be covered; and wherein in response to the selection, generating, using the processor, one or more new tests that cover the portion and updating the test plan by adding the one or more new tests.

4. The method of claim 3, wherein the graphical user interface allows the user to assign priorities to the selected coverage holes and define a limit on a number of new tests, wherein said generating the one or more new tests is performed while enforcing the limit on the number of new tests and giving precedence to covering the selected coverage holes based on their respective priorities.

5. The method of claim 4, wherein said generating reaches the limit on the number of new tests and wherein at least one of the selected coverage holes remains uncovered in the updated test plan.

6. The method of claim 3, wherein the user graphical interface allows the user to define a limit on a number of new tests, wherein said generating the one or more new tests is performed while enforcing the limit on the number of new tests.

7. The method of claim 1, wherein the graphical user interface is configured to reflect in the display an effect of modifying of the test plan on the coverage holes and to reflect in the display an effect of modifying the coverage holes on the test plan, whereby the graphical user interface provides a real-time synchronization between the display of the test plan and the display of the coverage holes.

8. A computer program product for assisting a user in modifying a test plan, the computer program product comprising program code embedded in a non-transitory data storage medium, wherein execution of the program code on a computer, causes the computer to perform the method comprising:
  obtaining the test plan, wherein the test plan comprises tuples of values of variables of a coverage model, wherein each tuple represents a test in the test plan;
  determining a first set of one or more coverage holes in the test plan with respect to the coverage model and with respect to an interaction level, wherein each coverage hole is defined by a combination of values that are not covered by the test plan; and
  providing a graphical user interface to the user, wherein the graphical user interface comprises a graphical display window visually displaying together a first windowpane and a second windowpane, wherein the first windowpane visually displays the test plan and the second windowpane visually displaying the first set of one or more coverage holes, and
  in response to the user interacting with the first windowpane of the graphical user interface and indicating an update to the test plan, determining a second set of one or more coverage holes in the modified test plan and continuously and immediately updating the second windowpane of the graphical user interface to visually display the second set of one or more coverage holes in the second windowpane instead of the first set of one or more coverage holes.

9. The computer program product of claim 8,
  wherein the user indicating an update to the test plan by selecting, in the graphical user interface, a portion of the first set of one or more coverage holes to be covered; and
  wherein in response to the selection, generating one or more new tests that cover the portion and updating the test plan by adding the one or more new tests.

10. The computer program product of claim 9, wherein the graphical user interface allows the user to assign priorities to the selected coverage holes and define a limit on a number of new tests, wherein said generating the one or more new tests is performed while enforcing the limit one the number of new tests and giving precedence to covering the selected coverage holes based on their respective priorities.

11. The computer program product of claim 10, wherein said generating reaches the limit on the number of new tests and wherein at least one of the selected coverage holes remains uncovered in the updated test plan.

12. The computer program product of claim 9, wherein the graphical user interface allows the user to define a limit on a number of new tests, wherein said generating the one or more new tests is performed while enforcing the limit on the number of new tests.

13. The computer program product of claim 8, wherein the graphical user interface is configured to reflect in the display an effect of modifying of the test plan on the coverage holes and to reflect in the display an effect of modifying the coverage holes on the test plan, whereby the graphical user interface provides a real-time synchronization between the display of the test plan and the display of the coverage holes.

14. The computer program product of claim 8 wherein the update to the test plan is selected from the group consisting of:
  adding a new test to the test plan;
  removing an existing test from the test plan; and
  modifying an existing test in the test plan by modifying at least one value in a corresponding tuple.

15. A computerized apparatus for assisting a user in modifying a test plan, the computerized apparatus having a processor that is adapted to perform the steps of:
  obtaining the test plan, wherein the test plan comprises tuples of values of variables of a coverage model, wherein each tuple represents a test in the test plan;
  determining a first set of one or more coverage holes in the test plan with respect to the coverage model and with respect to an interaction level, wherein each coverage hole is defined by a combination of values that are not covered by the test plan; and
  providing a graphical user interface to the user, wherein the graphical user interface comprises a graphical display windows visually displaying together a first windowpane and a second windowpane, wherein the first windowpane visually displays the test plan and the second windowpane visually displaying the first set of one or more coverage holes, and
  in response to the user interacting with the first windowpane of the graphical user interface and indicating an update to the test plan, determining a second set of one or more coverage holes in the modified test plan and continuously and immediately updating the second windowpane of the graphical user interface to visually display the second set of one or more coverage holes in the second windowpane instead of the first set of one or more coverage holes.

16. The computerized apparatus of claim 15,
  wherein the user indicating an update to the test plan by selecting, in the graphical user interface, a portion of the first set of one or more coverage holes to be covered; and
  wherein in response to the selection, generating one or more new tests that cover the portion and updating the test plan by adding the one or more new tests.

17. The computerized apparatus of claim 16, wherein the graphical user interface allows the user to assign priorities to the selected coverage holes and define a limit on a number of new tests, wherein said generating the one or more new tests is performed while enforcing the limit one the number of new tests and giving precedence to covering the selected coverage holes based on their respective priorities.

18. The computerized apparatus of claim 17, wherein said generating reaches the limit on the number of new tests and wherein at least one of the selected coverage holes remains uncovered in the updated test plan.

19. The computerized apparatus of claim 16, wherein the graphical user interface allows the user to define a limit on a number of new tests, wherein said generating the one or more new tests is performed while enforcing the limit on the number of new tests.

20. The computerized apparatus of claim 15, wherein the graphical user interface is configured to reflect in the display an effect of modifying of the test plan on the coverage holes and to reflect in the display an effect of modifying the coverage holes on the test plan, whereby the graphical user interface provides a real-time synchronization between the display of the test plan and the display of the coverage holes.

21. The computerized apparatus of claim 15, wherein the update to the test plan is selected from the group consisting of:
  adding a new test to the test plan;
  removing an existing test from the test plan; and modifying an existing test in the test plan by modifying at least one value in a corresponding tuple.

\* \* \* \* \*